United States Patent [19]

Maxwell

[11] 4,146,508

[45] Mar. 27, 1979

[54] PROCESS OF RECLAIMING RUBBER AND REFINING RECLAIMED RUBBER

[75] Inventor: Bryce Maxwell, Princeton, N.J.

[73] Assignee: U.S. Rubber Reclaiming Co., Inc., Vicksburg, Miss.

[21] Appl. No.: 767,023

[22] Filed: Feb. 9, 1977

Related U.S. Application Data

[63] Continuation-in-part of Ser. No. 581,796, May 29, 1975, abandoned.

[51] Int. Cl.² ............................................. C08J 11/04
[52] U.S. Cl. ....................................... 260/2.3; 260/710
[58] Field of Search ................................. 260/2.3, 710

[56] References Cited

U.S. PATENT DOCUMENTS

| | | | |
|---|---|---|---|
| 2,461,192 | 2/1949 | Banbury et al. | 260/710 |
| 2,653,349 | 9/1953 | Elgin et al. | 264/176 R |
| 2,767,149 | 10/1956 | Wendrow | 260/710 |
| 2,804,651 | 9/1957 | Peterson | 260/710 |
| 2,966,468 | 12/1960 | Dasher | 260/2.3 |
| 3,046,603 | 7/1962 | Maxwell | 264/311 |
| 3,051,990 | 9/1962 | Peterson | 425/190 |
| 3,790,328 | 2/1974 | Maxwell | 425/381.2 |
| 3,863,905 | 2/1975 | Maxwell | 259/191 |
| 3,873,474 | 3/1975 | Ficker | 260/2.3 |

*Primary Examiner*—Walter C. Danison
*Attorney, Agent, or Firm*—Robert E. Burns; Emmanuel J. Lobato; Bruce L. Adams

[57] ABSTRACT

Previously vulcanized rubber to be reclaimed is fed in particulate form (e.g. ground tire stock) together with reclaiming agents to a passageway between an essentially smooth stator and an essentially cylindrical rotor arranged to provide an axial shear zone therebetween in which the rubber is frictionally propelled by the rotor action and subjected at least to the generated pressure and heat and expelled axially through an orifice. The action may be assisted by mixing a suitable amount of previously reclaimed rubber or of unvulcanized rubber with or in advance of the particulate vulcanized rubber, and/or by supplemental heating. In other aspects of the invention, previously-reclaimed previously-vulcanized rubber is similarly fed and acted upon as a substitute for conventional refining operations.

18 Claims, 3 Drawing Figures

PROCESS OF RECLAIMING RUBBER AND REFINING RECLAIMED RUBBER

REFERENCE TO PRIOR APPLICATION

This application is a continuation-in-part of my application Ser. No. 581,796 filed May 29, 1975, now abandoned.

BACKGROUND OF THE INVENTION

1. Field of the Invention

Vulcanized rubber is conventionally reclaimed by subjecting it to heat and pressure, often in the presence of suitable oils and/or chemicals, and certain screw machines have been found to be desirable for these purposes. After being reclaimed, refining processes are used to smooth the product.

2. Description of the Prior Art

In U.S. Pat. Nos. 2,653,348, 2,653,349 and 2,653,915, issued Sept. 29, 1953 to Elgin and Sverdrup, and 3,051,990 issued Sept. 4, 1962 to Peterson, there are described processes and apparatus for reclaiming previously-vulcanized rubber wherein the rubber (e.g. ground tire stock) is fed to a screw rotating inside a stationary cylindrical chamber and adapted to effect a shearing action on the rubber and to generate heat therein and is then expelled or discharged through an annular channel.

In the conventional subsequent refining steps the product (previously-vulcanized rubber in reclaimed form) is squeezed between rolls and wound up into many layers to form a sheet on a wind-up drum, and cut when the wind-up drum is full. The purpose of the squeezing between rolls is to break down the particles of reclaimed rubber and to smooth them out to form a homogeneous sheet; but the current process requires a great deal of attention and labor.

Various types of apparatus having stator and rotor surfaces without screw flights or like propulsion means on the rotor have been proposed for extruding elastic melt material and similar substances. Examples of these are the Maxwell U.S. Pat. Nos. 3,046,603, 3,554,041 and 3,790,328; but, in spite of their effectiveness in the melt-extrusion field, they have neither been suggested for or adapted to the reclaiming of rubber or the refining of reclaimed rubber, nor have processes therefor been disclosed or suggested.

SUMMARY OF THE INVENTION

The invention involves feeding particulate vulcanized rubber between a stator and a rotor having essentially smooth opposing surfaces and providing, in an axial gap therebetween, a shear zone in which the rubber is centripetally propelled by rotor action, subjected to the pressure and heat in at least the quantity evolved thereby, and guided to and expelled axially through an orifice. The term "axial gap" refers to the space between the end of the essentially smooth cylindrical rotor and the essentially smooth internal surface of the stator adjacent the outlet orifice, both surfaces of said gap being generally perpendicular to the axis of the rotation of the rotor. The term "orifice" as used herein is intended to include multiple as well as single orifices of various shapes.

In order to increase the throughput there may be added to the particulate vulcanized rubber a relatively small amount of previously reclaimed rubber or of unvulcanized rubber. This may be added continuously in uniform proportion to the input, added in a larger amount initially and thereafter in a smaller amount, added only initially, or introduced prior to the introduction of the particulate vulcanized rubber at the beginning of an operation. The added material will, because of its tackiness or stickiness, overcome in whole or in part the tendency of the vulcanized rubber particles to slip, and will at the same time conform to the requirements of a reclaimed rubber and even enhance the properties thereof. Additional heat may be imparted to the material being reclaimed, and it is generally desirable to preheat the extruder at the beginning of the operation.

In other of its aspects the invention contemplates the treatment of reclaimed rubber (produced by a screw, autoclave, the present reclaiming process, or other process) between essentially smooth opposing surfaces of a stator and rotor of the type contemplated, to perform a refining action so as to do away with the necessity of refining between rollers, or to provide a smoother product.

In a number of instances, a reduction in the quantity of reclaiming agents may be effected in reclaiming operations in accordance with the invention.

BRIEF DESCRIPTION OF DRAWINGS

The nature objects and advantages of the invention will be more fully understood from the following description in conjunction with the accompanying drawings in which.

DESCRIPTION OF APPARATUS FOR CARRYING OUT PROCESS OF INVENTION

Figure 1:
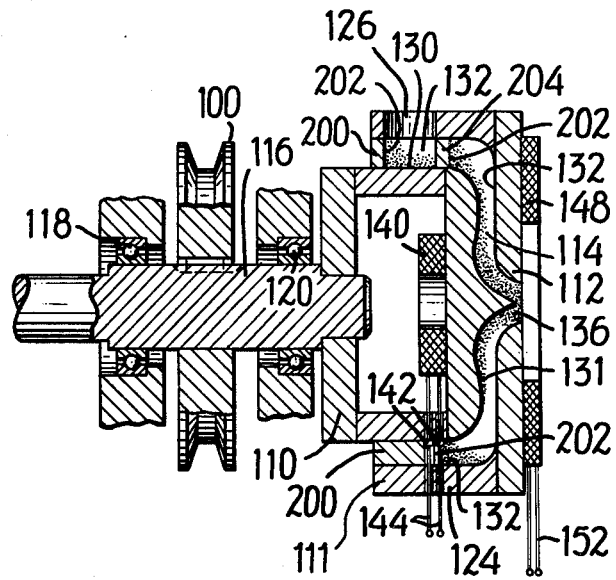
FIG. 1 is an axial sectional view of apparatus suitable for carrying out the process of the present invention.
Figure 2:
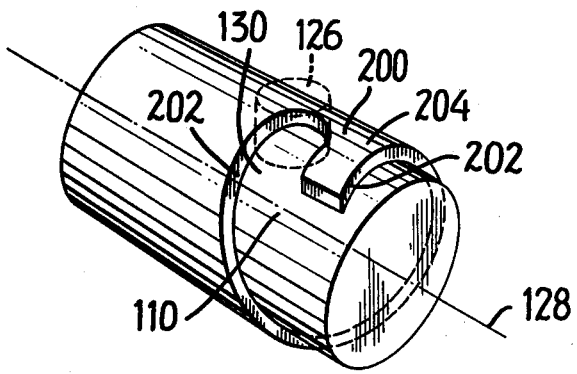
FIG. 2 is a schematic perspective view of portions of the apparatus.

IN FIGS. 1 and 2 of the drawings there is shown by way of example apparatus which is suitable for carrying out the process of the present invention. The apparatus is shown as comprising a rotor 110 mounted on a shaft 116 which is rotatable supported by bearings 118 and 120. The shaft and hence the rotor is rotatable by means of a pulley 100. The rotor 110 is generally cylindrical with an essentially smooth cylindrical surface 130 and an end face 131 which is essentially smooth and generally perpendicular to the axis of the rotor although it may be somewhat curved in the axial section as seen in FIG. 1.

The rotor 110 is rotatable in a stationary casing 124 which has a cylindrical portion 111 which surrounds the rotor and an end 112 having an inner surface 132 which is spaced from the end face 131 of the rotor so as to provide an axial shear zone 114. The inner surface 132 of the end portion 112 of the casing is essentially smooth and is generally perpendicular to the axis of the rotor but may be somewhat curved in axial section as illustrated in FIG. 1 so as to conform generally to the curvature of the end face 131 of the rotor.

The cylindrical portion 111 of the casing 124 is provided with an inlet 126 for feeding material to be processed. The end portion 112 of the casing is provided with a central opening 136 for discharge of the processed materials. Between the cylindrical portion 111 of the casing and the cylindrical surface of the rotor there is interposed a guide ring or scroll 200 which is held stationary through a suitable connection with the stator.

As seen in FIG. 2 the guide ring 200 has a surface 202 which spirals about the rotor from the feed inlet 126 to the shear zone 114 between the end of the rotor and the end of the casing or stator. The stationary spiral surface 202 extends around the rotor more than one full convolution so as to provide a portion 204 of the guide ring 200 disposed between the inlet 126 and the shear zone 114 so as axially to isolate the inlet from the shear zone. Through rotation of the rotor in a counterclockwise direction as viewed in FIG. 2 the material fed into the inlet 126 is moved circumferentially by the rotor and axially by the stationary surface 202 of the guide ring 200 so as to be fed into the shear zone 114 between the end surface 131 of the rotor and the inner surface 132 of the end 112 of the stator.

Means is provided for heating the rotor and also the stator. The rotor heater is shown by way of example as an electric heater 140 mounted in the rotor 110 and powered through a slip ring 142 and conductors 144. A stator heater 148 may be mounted adjacent the end portion 112 of the stator and powered through conductors 152. Suitable means (not shown) may also be provided for cooling the rotor and the stator.

Suitable means (not shown) may be provided for feeding to the inlet 126 the material that is to be processed. For example the material may be fed by a screw extruder. Moreover the material may be propelled by screw means or otherwise after its passage between the essentially smooth surfaces of the rotor and the stator, for example to drive it through a perforated screen or for other purposes as disclosed in Maxwell U.S. Pat. No. 3,863,905 issued Feb. 4, 1975.

In order to adapt the apparatus to the process being carried out, means is provided for varying the speed of rotation of the rotor, the axial shear gap between the rotor and stator and the rate of feed of the material. Also as indicated above means is provided for controlling the temperature of the rotor and of the stator.

DESCRIPTION OF PROCESS OF INVENTION

In reclaiming rubber by the process of the present invention using apparatus of the kind illustrated by way of example in the drawings, the rubber to be reclaimed, for example ground tire stock is introduced through the inlet 126 so as to be applied to the cylindrical surface 130 of the rotor 110. As the cylindrical surface 130 rotates with respect to the guide ring 200, the material is urged axially by the spiral surface 202 toward the axial shear zone 114 between the end surface 131 of the rotor and the inner surface 132 of the end 112 of the stator. In the gap 114, between the rotor and the stator, vulcanized rubber material is subjected to a shearing action and to pressure and heat in at least the quanity evolved thereby and is centripetally propelled toward the outlet 136 by rotor action. The centripetal propulsion of the material will be understood by reference to FIG. 3 in which A represents the stator 124 and B represents the rotor 110. $X_1$ represents a point on the end surface of the rotor and Y represents a point on the inner surface of the end of the stator which is directly opposite $X_1$ at any given instant of time. As the rotor rotates in a counterclockwise direction, as viewed in FIG. 3, the point $X_1$ will move to some position $X_2$ along the curved path $X_1 - X_2$. Assuming that the rubber being reclaimed adheres to the surfaces of the rotor and the stator at points $X_1$ and Y and that it is elastic, it will be stretched along the path $X_1 - X_2$. The elastic behavior of the rubber is like stretching a rubber band along the curved path $X_1 - X_2$ and the tendency for elastic recovery gives rise to a force toward the center of rotation as represented by the arrow Z. This force toward the center of rotation or centripetal force which is generated in and acts on the material gives rise to a centripetal flow of the material toward the outlet 136. Since the entire area between the end of the rotor and the end of the stator contributes to the centripetal pumping action, the material through-put of the apparatus is not limited by the pressure development by the spiral surface 202 of the guide ring 200 but rather by the centripetal pumping action itself. From the rubber band analogy it becomes apparent that a proper combination of elastic and viscus properties of the material and wetting ability of the surfaces of the rotor and stator by the material is necessary to obtain the centripetal pumping action for propelling the material to and out of the outlet 136.

In order to increase the centripetal pumping action and thereby increase the through-put there may be added to the particulate vulcanized rubber a relatively small amount of previously reclaimed or unvulcanized rubber. This may be added continuously in uniform proportion to the input, added in a larger amount initially and thereafter in a smaller amount, added only initially, or introduced prior to the introduction of the particulate vulcanized rubber at the beginning of an operation. The added material will because of its tackiness or stickiness overcome in whole or in part the tendency of the vulcanized rubber particles to slip on the rotor and will at the same time conform to the requirements of a reclaimed rubber and even enhance its properties.

The axial shear gap between the end face 131 of the rotor and the inner surface 132 of the end 112 of the stator and the speed of rotation of the rotor are controlled according to the character of the rubber to be reclaimed and the desired characteristics of the reclaimed rubber. Temperature is also controlled. It is generally desirable to preheat the rotor and stator at the beginning of operation and the heat may continue to be applied. However, the heat generated in the material particularly at higher rotor speed may be sufficient to require cooling in order to avoid burning the material.

The physical properties of reclaimed rubber produced by the process of the present invention are comparable to those of reclaim produced by screw type extruders while the power consumption per pound of reclaim is appreciable less and the results attained are somewhat more uniform. Moreover the process of the present invention has been found satisfactorily to reclaim butyl, for example that used in inner tubes.

Moreover the process in accordance with the present invention has been found to be effective in refining reclaimed rubber and in mixing fillers with reclaimed rubber.

DESCRIPTION OF RECLAMING EMBODIMENTS

EXAMPLE 1

Rubber crumb (particulate vulcanized rubber) with usual reclaiming agents were fed into apparatus of said type shown in the drawing and having a ⅜" diameter rotor. The rotational speed was 240 r.p.m., the axial shear gap setting was 0.025". The variacs were set at 60 and 60. After a period of operation the rotor temperature reached 480° F. and the stator header temperature reached 410° F. The treated rubber extruded in a ⅛" diameter essentially continuous strand, which was tacky and exhibited the properties of a reclaimed rubber. The rate of extrusion was 2 grams per minute.

Examples 2-12 with the indicated axial gaps and rotor speeds are detailed in the following table. These processes were carried out in a larger elastic melt extruder of said type shown in the drawings having a 2" rotor, a single quarter-inch orifice, and a rounded surface at the inner annular corner where the front and side of the stator meet. Usual reclaiming agents were mixed with particulate vulcanized rubber of the character shown in the last line of the table, and fed to the extruder. In example 12, 5% of the reclaimed product was recycled. Rotor speeds within a 150 to 450 r.p.m. range for the exemplified two-inch rotor machine were employed, as indicated. Also as indicated, Mooney viscosities (ML4 212° F.) well under 85 were obtained. The reclaim from all examples in the above table was, as desired, very tacky. In each case the extruder was heated (as indicated in the table) at the beginning of the operation, and the axial shear gap was set as there indicated. It will be recognized that said axial gap can be adjusted to provide the desired amount of mechanical shear work to achieve the desired amount of reclaiming. Carbon black was mixed with the reclaim in Examples 2-10, and was present in the reclaim of Examples 11 and 12; and the reclaim was refined and cured in the standard manner prior to the tests indicated in the table. Generally, axial shear gaps of from 0.030 to 0.005 are desirable for use with this size extruder. The reclaim of each of Examples 3, 4, 5, 6, 7, 8, 11, and 12, was water cooled as it came from the extruder.

The mix of rubber crumb and the reclaiming agents used was 100 parts of ground scrap, 5 parts of a dipentene type rubber solvent, 5 parts of mixed rosin acids, 5 parts of heat-treated tall oil pitch, 1.2 parts of mixed disulfides, 0.5 parts of water, 0.5 parts of mixed amines, 4.0 parts of carbon black, 2.5 parts of clay and 2.0 parts of mineral rubber (blown asphalt).

Table 1

| Example | Reclaiming | | | | | | | | | | |
|---|---|---|---|---|---|---|---|---|---|---|---|
| | 2 | 3 | 4 | 5 | 6 | 7 | 8 | 9 | 10 | 11 | 12 |
| Axial gap, inches | 0.030 | 0.030 | 0.030 | 0.030 | 0.030 | 0.020 | 0.020 | 0.050 | 0.050 | 0.030 | 0.005 |
| Rotor speed, rpm | 200 | 200 | 250 | 300 | 350 | 200 | 350 | 150 | 300 | 250 | 250 |
| init. | 260 | 300 | 300 | 300 | 300 | 300 | 300 | 230 | 250 | 360 | 210 |
| Rotor zone temp. final° F. | 260 | 300 | 300 | 300 | 300 | 300 | 300 | 270 | 300 | 360 | 300 |
| init. | 260 | 300 | 300 | 300 | 300 | 300 | 300 | 210 | 250 | 360 | 210 |
| Header temp. final° F. | 392 | 310 | 320 | 350 | 350 | 310 | 350 | 290 | 340 | 390 | 370 |
| Through-put g/min. | 4.7 | 2.4 | 2.8 | 3.1 | 3.5 | 1.9 | 2.8 | 2.4 | 2.5 | 5.1 | 9.6 |
| Modulus at 200% | | | | | | | | | | | |
| 10' at 293° F. | 500 | 660 | 580 | 630 | 610 | 680 | 580 | | | *820 | *1100 |
| 20' at 293° F. | 700 | 760 | 570 | 710 | 720 | 820 | 740 | | | *850 | *1130 |
| Tensile | | | | | | | | | | | |
| 10' at 293° F. | 830 | 950 | 920 | 950 | 880 | 940 | 900 | | | 1190 | 1280 |
| 20' at 293° F. | 970 | 1050 | 1050 | 1030 | 990 | 1000 | 990 | | | 1350 | 1330 |
| % Elongation | | | | | | | | | | | |
| 10' at 293° F. | 340 | 280 | 310 | 310 | 290 | 290 | 320 | | | 410 | 350 |
| 20' at 293° F. | 300 | 270 | 270 | 290 | 270 | 250 | 260 | | | 430 | 350 |
| ML4 at 212° F. | | | | | | | | | | | |
| Mooney viscosity | 45 | 66 | 58 | 62 | 59 | 72 | 54 | 90 | 70 | 30 | 23 |
| Shore A Hardness | 62 | 50 | 53 | 50 | 58 | 57 | 56 | | | 49 | 53 |
| Sp. Gr. | 1.190 | 1.165 | 1.170 | 1.170 | 1.170 | 1.170 | 1.170 | | | 1.160 | 1.165 |
| Type scrap | Whole tire | Whole tire | Whole tire | Whole tire | Whole tire | Whole tire | Whole tire | Whole tire | Whole tire | Natural rubber | Natural rubber |

*Modulus at 300% Elongation

The mix used in curing the reclaim was 232.5 parts of reclaim, 3 parts of sulfur, 5 parts of ZnO, 0.5 parts of Captax, 0.2 parts of DPG, and 2 parts of stearic acid.

EXAMPLES 13-21

Eight samples of rubber reclaim (Examples 13 to 20) were prepared by the process of the present invention using apparatus of the kind shown on the drawings with a 2" rotor. A ninth sample (Example 21) was prepared with a screw type extruder. Enough crumb (whole tire stock) with usual reclaiming agents were taken from the discharge of a pug mill for all of the tests in this series. The initial temperature, axial gap and rotor speed for examples 13 to 20 are shown in Table 2. All samples were allowed to fall into water as they were extruded to prevent scorching. After measurement of the viscosity, carbon black was mixed into the reclaim and the samples were then refined. It will be seen that the characteristics of the reclaim produced by the process of the present invention (Examples 13–20) are comparable to those of the reclaim produced with a screw extruder (Example 21) although the viscosity is a little higher.

TABLE 2

| EXAMPLE | RECLAIMING | | | | | | | | |
|---|---|---|---|---|---|---|---|---|---|
| | 13 | 14 | 15 | 16 | 17 | 18 | 19 | 20 | 21 |
| INITIAL TEMPERATURE | | | | | 150° C. | | | | |
| AXIAL GAP | | 0.030" | | | | | 0.020" | | |
| ROTOR SPEED, RPM | 200 | 250 | 300 | 350 | 200 | 250 | 300 | 350 | |
| THROUGH-PUT g/min. | 2.4 | 2.8 | 3.1 | 3.5 | 1.9 | 2.2 | 2.4 | 2.8 | |
| MOONEY VISCOSITY ML4 CURE AT 293° F. | 66 | 58 | 62 | 59 | 72 | 61 | 65 | 54 | 49 |
| MOD AT 200% 10' | 660 | 580 | 630 | 610 | 680 | 740 | 600 | 580 | 630 |
| 20' | 760 | 770 | 710 | 720 | 820 | 780 | 740 | 740 | 810 |
| TENSILE AT 293° F. 10' | 950 | 920 | 950 | 880 | 940 | 950 | 870 | 900 | 880 |
| 20' | 1050 | 1050 | 1030 | 990 | 1000 | 1020 | 1030 | 990 | 1030 |
| % ELONGATION 10' | 280 | 310 | 310 | 290 | 290 | 270 | 290 | 320 | 290 |
| AT 293° F. 20' | 270 | 270 | 290 | 270 | 250 | 260 | 270 | 260 | 260 |
| SHORE HARDNESS 10' | 47 | 50 | 46 | 56 | 55 | 53 | 55 | 55 | 55 |
| 20' | 52 | 55 | 55 | 60 | 58 | 57 | 59 | 60 | 57 |

EXAMPLES 22 to 25

In order to determine effect of particle size on the process of the present invention whole tire crumb were sieved to obtain the particle sizes shown in Table 3. The crumb was mixed with usual reclaiming agents and fed into apparatus of the type shown in the drawings with a 2" rotor. Operating conditions for the reclaiming step were constant except for a variation in header temperatures and in throughput rates. No difficulties were encountered in reclaiming the −30 or −20 mesh crumb. The ¼" particles were oily when mixed with the reclaiming oils. This caused slippage on the rotor. Small bits of vulcanized rubber were extruded with the reclaim produced with the larger particle size feeds.

Mill mixing was used to incorporate fillers into the reclaim. Each sample was refined and cured. As seen from Table 3, physical properties were similar on the −30 and −20 mesh samples. The modulus and tensile strength were lower on the larger particles sized samples. The operating conditions and results are shown in Table 3.

TABLE 3

| | EFFECT OF PARTICLE SIZE | | | |
|---|---|---|---|---|
| Example No. | 22 | 23 | 24 | 25 |
| Ground scrap (−30 mesh) | 100.0 | | | |
| Ground scrap (−20 mesh) | | 100.0 | | |
| Ground scrap (5%+10, 85%+20, 10%−20) | | | 100.0 | |
| Ground scrap (¼ inch) | | | | 100.0 |
| Operating Conditions: | | | | |
| Axial gap, inches | 0.030 | 0.030 | 0.030 | 0.030 |
| Rotor speed, rpm | 300 | 300 | 300 | 300 |
| Rotor zone temp., °C. | 125–125 | 125–125 | 125–125 | 125–125 |
| Header temperature | 125–185 | 125–185 | 125–175 | 125–180 |
| Rate, gm/min | 8.2 | 7.8 | 7.6 | 6.9 |
| Modulus at 200% Elong. | | | | |
| 10′ at 293° F. | 540 | 700 | 640 | 500 |
| 20′ at 293° F. | 840 | 900 | — | — |
| Tensile | | | | |
| 10′ at 293° F. | 790 | 770 | 800 | 600 |
| 20′ at 293° F. | 950 | 930 | 830 | 750 |
| % Elongation | | | | |
| 10′ at 293° F. | 280 | 240 | 250 | 260 |
| 20′ at 293° F. | 230 | 200 | 190 | 750 |
| Mooney Viscosity ML-4 | 66 | 68 | 56 | 44 |

EXAMPLES 26–31

In carrying out the tests of Examples 26–31 the apparatus used is of the same type of that used for previous examples but has a 6" rotor rather than a 2" rotor. The radial thickness of the guide ring 200 of the 6" machine is 1" as compared with ¼" for the 2" machine. The samples used for Examples 26–28 were −30 mesh whole tire crumb, for Example 29 was −20 whole tire crumb and for Examples 30 and 31 were −30 mesh natural rubber. The parameters of the tests and the results obtained are set out in Table 4. Normal whole tire reclaims were obtained in Examples 26–28. The coarser crumb (−20 mesh) of Example 29 yielded a coarse reclaim. The physical properties were good but the reclaim was rough. Moreover the reduced oil level appeared to result in some scorching. The natural rubber with the formulation used produced a reclaim of low Mooney viscosity and tackiness was a problem.

TABLE 4

| | RECLAIMING | | | | | |
|---|---|---|---|---|---|---|
| Type | WT −30 | WT −30 | WT −30 | WT −20 | NR −30 | NR −30 |
| Example No. | 26 | 27 | 28 | 29 | 30 | 31 |
| *Forced feed | Yes | Yes | Yes | Yes | Yes | Yes |
| Axial gap, in. | 0.20 | 0.20 | 0.20 | 0.20 | 0.10 | 0.15 |
| Rotor, spd, RPM | 75 | 100 | 125 | 60 | 75 | 75 |
| Rotor, Temp., ° 350 | 350 | 350 | 350 | 350 | 350 | |
| Extrudate Temp., ° F. | 420 | 440 | 440 | 465 | 440 | 430 |
| AMPS. | 100 | 110 | 105 | 125 | 120 | 100 |
| Output, lbs./hr. | 99 | 165 | 183 | 104 | — | 90 |
| Mooney Viscosity ML′4 | 78 | 104 | 76 | 110 | 35 | 39 |
| Modulus at 200% | | | | | | |
| 10′ at 293 | 510 | 580 | 550 | 650 | 870 | 860 |
| 20′ at 293 | 700 | 750 | 700 | 910 | 1020 | 1020 |
| Tensile | | | | | | |
| 10′ at 293 | 980 | 1040 | 890 | 940 | 1600 | 1500 |
| 20′ at 293 | 1110 | 1200 | 1100 | 1210 | 1590 | 1570 |
| % Elongation | | | | | | |
| 10′ at 293 | 370 | 340 | 320 | 290 | 480 | 480 |
| 20′ at 293 | 310 | 310 | 300 | 270 | 430 | 430 |
| Sp. Gr. | 1.17 | 1.17 | 1.17 | 1.175 | — | — |

A comparison of the 2" machine and the 6" machine permits a calculation of the theoretical output of larger machines. Two factors that would influence the output would be rotor speed and scroll volume. Machine efficiency should also be considered. Using the 6" machine as a base:

$$\text{Factor 1} = C_n^2 / C_6^2$$

where $C_n$ = Circumference of machine being compared to the 6" machine and $C_6$ = the circumference of the 6" machine $$\text{Factor 2} = V_n / V_6$$

where $V_n$ = volume of scroll of machine being compared to 6" machine and $V_6$ = volume of scroll of 6" machine Assuming the output of the 6" machine to be 100 lbs./hr. (which is somewhat higher than the actual values obtained in Examples 26-29) the theoretical output of machines of different diameter can be calculated as follows:

claim was obtained in all tests. The power required was approximately 26 h.p. in each test. This would represent 7.1 lbs/h.p. for the maximum throughput as opposed to 6.7 lbs./h.p. for a screw type reclaimer. This represents a 7% increase over the present system. Moreover it will be seen that the process of the invention provides effective and efficient means for mixing fillers with the reclaim.

TABLE 5

| Example No. | RECLAIMING | | | | | | | | | | |
|---|---|---|---|---|---|---|---|---|---|---|---|
| | 32 | 33 | 34 | 35 | 36 | 37 | 38 | 39 | 40 | 41 | 42 |
| Rotor Temp. | 350 | 350 | 350 | 350 | 350 | 350 | 350 | 350 | 350 | 350 | 350 |
| Extrudate Temp. ° F. | 470 | 480 | 460 | 490 | 480 | 470 | 460 | 420 | 410 | 400 | 420 |
| Rotor Speed, rpm | 75 | 100 | 125 | 75 | 100 | 125 | 125 | 125 | 75 | 75 | 125 |
| Feeder Speed, rpm | 40 | 40 | 40 | 32 | 32 | 60 | 32 | 60 | 30 | 60 | 60 |
| Amps. uncorrected | 75–80 | 70–75 | 75–80 | 80 | 75 | 80 | 60 | 90 | 55 | 95 | 80 |
| Through-put rate, #/hr. | 100 | 111 | 185 | 98 | 98 | 171 | 146 | 216 | 127 | 217 | 209 |
| Axial gap, inches | 0.200 | 0.200 | 0.200 | 0.100 | 0.100 | 0.100 | 0.100 | 0.100 | 0.500 | 0.050 | 0.050 |
| Tensile | | | | | | | | | | | |
| 30' at 287 | 650 | 560 | 650 | 630 | 660 | 690 | 660 | 750 | 750 | 790 | 840 |
| % Elongation | | | | | | | | | | | |
| 30' at 287 | 270 | 280 | 290 | 270 | 240 | 260 | 240 | 290 | 280 | 310 | 310 |
| Hardness | | | | | | | | | | | |
| 30' at 287 | 68 | 66 | 68 | 71 | 74 | 71 | 73 | 68 | 69 | 67 | 65 |
| Sp. Gravity | 1.309 | 1.305 | 1.312 | 1.315/1.317 | 1.315 | 1.315 | 1.290 | 1.305 | 1.300 | 1.290 | |
| Mooney Visc. ML-4 | 33 | 34 | 40 | 32 | 37 | 45 | 52 | 54 | 56 | 56 | 62 |

| Dia. | Factor 1 above | Scroll vol cu. in. | Factor 2 | Theoretical output lb/hr. |
|---|---|---|---|---|
| 2" | .11 | 1.2 | .03 | 0.7 |
| 6" | 1.0 | 37.8 | 1.0 | 200 |
| 12" | 4.0 | 75.4 | 2.0 | 1600 |
| 14" | 5.4 | 88.0 | 2.3 | 2484 |

As will be seen from other tests described below the theoretical value of 200 lbs./hr. was exceeded in some instances.

EXAMPLES 32-42

The results of further tests carried out to evaluate the performance of the 6" diameter machine are set out in Table 5. As in the previous tests the machine was driven with a 200 h.p. drive unit having a 245 volt d.c. power supply. As only about 30 h.p. was required to drive the machine, the motor was operating in an inefficient range. A load of 12amps. was required for running the clean empty machine. This was not deducted in calculations of lbs./h.p.

The samples used for Examples 32-37 were −30 mesh whole tire crumb with 17 parts of reclaiming agents. The samples used for Examples 38-42 were the same except for the addition of 65 parts of fillers. The test conditions and results are shown in Table 5. A product having the characteristics of good quality re-

EXAMPLES 43-48

The results of further tests in reclaiming whole tire stock and undevulcanized butyl are set up in Table 6. For these tests the 6" diameter machine was modified in the following respects. A hollow rotor was used to allow better temperature control. A scroll having a depth of ¼" was used instead of the 1" deep scroll used in prior tests. Meters were installed so that voltage and current could be monitored more accurately. As in prior tests a screw type feeder was used to feed the screwless extruder.

The samples used in Examples 43, 44 and 45 were −30 mesh whole tire crumb with 17 parts of reclaiming agents. The extrudate had the properties of good quality reclaim in all of these tests. A Banbury mixer was used to mix fillers into the reclaim powder. Refining was accomplished by a single pass through the laboratory refiner. The samples were cured using standard procedures.

The samples used for Examples 46, 47 and 48 were cryogenically grond −30 mesh undevulcanized butyl (inner tubes). No problems were encountered with the ground butyl except that a considerable amount of gas was evolved so that venting was required. The butyl reclaim was lab refined and cured for analysis. The properties of the reclaim are shown in Table 6.

TABLE 6

| | −30 MESH WHOLE TIRE CRUMB | | | | −30 MESH BUTYL | | |
|---|---|---|---|---|---|---|---|
| Example No. | 43 | 44 | 45 | Example No. | 46 | 47 | 48 |
| Rotor temp., ° F. | 400 | 400 | 400 | Rotor temp., ° F. | 400 | 400 | 400 |
| Extrudate temp., ° F. | 480 | 430 | 465 | Extrudate temp., ° F. | 480 | 490 | 500 |
| Rotor speed, rpm. | 175 | 120 | 175 | Rotor speed, rpm. | 85 | 120 | 175 |
| Feeder speed, rpm. | 60 | 45 | 80 | Feeder speed, rpm. | 25 | 43 | 55 |
| Amps. | 88 | 84 | 88 | Amps. | 84 | 92 | 94 |
| Volts | 220 | 165 | 220 | Volts | 110 | 165 | 220 |
| Axial gap, inches | 0.10 | 0.05 | 0.05 | Axial gap, inches | 0.050 | 0.050 | 0.050 |
| Rate, #/hr., Av. | 150 | 130 | 197 | Rate, #/hr. Av. | 99 | 131 | 185 |
| | | | | Modulus #300% Elongation | | | |
| | | | | 20' at 320° F. | 510 | 550 | 530 |
| Tensile | | | | Tensile | | | |
| 30' at 287° F. | 690 | 740 | 720 | 20' at 320° F. | 870 | 1130 | 950 |
| % Elongation | | | | % Elongation | | | |
| 30' at 287° F. | 230 | 240 | 220 | 20' at 320° F. | 500–580 | 530 | |
| | | | | Hardness | 44 | 48 | 47 |

TABLE 6-continued

| —30 MESH WHOLE TIRE CRUMB | | | | —30 MESH BUTYL | | | |
|---|---|---|---|---|---|---|---|
| Example No. | 43 | 44 | 45 | Example No. | 46 | 47 | 48 |
| Mooney viscosity, ML'4 | 61 | 70 | 64 | Mooney viscosity, ML'4 | 40 | 55 | 47 |

EXAMPLES 49–51

Other examples of reclaiming butyl and an example of reclaiming chlorobutyl are set out in Table 7. The material used was undevulcanized butyl and chlorobutyl inner tubes cut into small pieces for feed. No oils nor chemicals were added. The butyl and chlorobutyl were not mixed.

The apparatus used was a 2" diameter srewless extruder of the kind shown in the drawings.

In example 49 butyl pieces were fed into the screwless extruder with the operating conditions set out in Table 7. The processing consisted of a single pass through the screwless extruder followed by two passes throgh the laboratory refining mill. In example 50, butyl pieces were fed into the extruder as in example 49 and the process consisted of two passes through the extruder and one pass through the laboratory refiner. The extrudates of examples 49 and 50 were cured using normal procedures. No refining or mixing difficulties were encountered.

In Example 51 chlorobutyl scrap was reclaimed by one pass through the screwless extruder and was refined by using two passes through the laboratory refining mill. The extrudate was cured in usual manner. The physical properties of the chlorobutyl were somewhat lower than those of regular butyl.

TABLE 7

| | RECLAIMING BUTYL | | |
|---|---|---|---|
| Example No. | 49 | 50 | 51 |
| Scrap | Butyl | Butyl | Chlorobutyl |
| Conditions: | | | |
| Axial gap, inches | 0.020 | 0.020 | 0.020 |
| Rotor speed, rpm | 400 | 400 | 400 |
| Rotor zone temp, °C. | 150 | 150 | 200 |
| Header temp., °C. | 150–180 | 150–175 | 200–210 |
| Through-put rate | 16.3 | 33.2(2nd pass) | 14.7 |
| Analysis: | | | |
| Mooney Visc. ML4 | 30 | 30 | 49 |
| Modulus at 300% Elog. | | | |
| 20'at 320° F. | 740 | 670 | 480 |
| Tensile | | | |
| 20'at 320° F. | 1020 | 990 | 600 |
| % Elongation | | | |
| 20' at 320° F. | 440 | 500 | 430 |
| Hardness | | | |
| 20' at 320° F. | 52 | 50 | 53 |

EXAMPLE 52

Using a 2" srewless extruder of the kind shown in the drawings, cryogenically ground butyl reclaimed by the process of the present invention yielded a good quality reclaim and at a greater rate than is normally achieved using chopped butyl. The mix consisted of 100 parts butyl, 2 parts processing oil and 2 parts clay. After reclaiming, the sample was refined by usual laboratory procedures and cured for analysis. Operating conditions in the reclaiming process and the properties of the reclaim are shown in Table 8.

TABLE 8

| BUTYL RECLAIMING | |
|---|---|
| Example 52 | |
| Cryogenically ground butyl | |
| Sieve Analysis | |
| retained on | % |
| 14 mesh | 7 |
| 20 mesh | 22 |
| 30 mesh | 14 |
| 40 mesh | 18 |
| 80 mesh | 34 |
| 100 mesh | 2 |
| Operating Conditions: | |
| Axial gap, inches | 0.030 |
| Rotor speed, rpm | 400 |
| Temperature, °C. | 150 |
| Through-put rate gm/min | 24 |
| Modulus at 200% Elongation | |
| 20' at 320° F | 940 |
| Tensile | |
| 20' at 320° F | 1120 |
| % Elongation | |
| 20' at 320° F | 370 |
| Hardness | 51 |
| Sp. Gr. | 1.160 |
| Mooney Visc. ML'4 | 37 |

DESCRIPTION OF REFINING EMBODIMENTS

Examples 1F–9F

Reclaim was refined in the extruder of the type of the present invention having a 2" diameter rotor, the details and results being shown as indicated in the following table. The reclaim was prepared, except as indicated below, in a 3" screw reclaimer as disclosed in U.S. Pat. No. 2,653,915 modified as in U.S. Pat. No. 3,051,990. The reclaim of Examples 2F and 9F were prepared in the two-inch-diameter-rotor extruder of the type of the present invention itself using the reclaiming formula given below, a second pass through the extruder effecting the refining. In Examples 1F, 2F, and 9F, the above curing formula was used. In Examples 3F, 4F, 5F, 6F, 7F and 8F, no reclaiming agents were used. Two passes through the extruder were made in Examples 4F, 5F and 6F. The curing formula in Examples 3F–8F was 182 parts butyl reclaim (55% RHC), 5 parts ZnO, one part Methyl Tuads, 0.5 parts Captax, and 2 parts sulfur. In examples 3, 4 and 5 the refined product still contained bits of unrefined butyl. In Example 9F, the reclaiming formula was 100 parts natural rubber scrap, 3 parts of mixed rosin acids, 3 parts TX 55, 3 parts dipentene, and 6 parts carbon black.

TABLE 9

| | Refining | | | | | | | | |
|---|---|---|---|---|---|---|---|---|---|
| Example | 1F | 2F | 3F | 4F | 5F | 6F | 7F | 8F | 9F |
| Axial gap, inches | 0.020 | 0.020 | 0.050 | 0.030 | 0.030 | 0.010 | 0.005 | 0.005 | 0.005 |
| Motor speed, rpm | 200 | 200 | 150 | 100 | 300 | 100 | 200 | 450 | 200 |
| init. | 212 | 210 | 150 | 150 | 150 | 185 | 185 | 185 | 185 |
| Rotor Temp. °F.final | 300 | 285 | 210 | 165 | 250 | 255 | 185 | 200 | 200 |
| init. | 212 | 210 | 185 | 150 | 150 | 185 | 185 | 185 | 185 |
| Heater Temp. | 375 | 390 | 310 | 255 | 380 | 375 | 280 | 350 | 200 |

TABLE 9-continued

| | | | | Refining | | | | | |
|---|---|---|---|---|---|---|---|---|---|
| Example | 1F | 2F | 3F | 4F | 5F | 6F | 7F | 8F | 9F |
| °F.final | | | | | | | | | |
| Through-put g/min. | 15.3 | 13.0 | 8.0 | 11.0 | 20.6 | 11.0 | 6.0 | 19.6 | 25.1 |
| Modulus at 200% | | | Modulus at 300% | | | | | | |
| 10' at 293° F. | 780 | 530 | 20' at 320° F 1440 | 870 | 810 | 670 | 690 | 740 | 10' at 293° F 820 |
| 20' at 293° F. | 810 | 690 | 30' at 320° F 1510 | 910 | 890 | 750 | 750 | 810 | 20' at 293° F 850 |
| Tensile | | | Tensile | | | | | | |
| 10' at 293° F. | 1120 | 620 | 20' at 320° F 1510 | 1230 | 1150 | 1080 | 1120 | 1190 | 10' at 293 1190 |
| 20' at 293° F. | 1070 | 790 | 30' at 320° F 1550 | 1300 | 1250 | 1120 | 1190 | 1230 | 20' at 293 1350 |
| %Elongation | | | % Elongation | | | | | | |
| 10' at 293° F. | 290 | 270 | 20' at 320 330 | 440 | 440 | 500 | 500 | 520 | 10' at 293 410 |
| 20' at 293° F. | 280 | 250 | 30' at 320 320 | 450 | 440 | 470 | 510 | 510 | 20' at 293 430 |
| MI4 at 212° F. Mooney Viscosity | 58 | 47 | 63 | 67 | 62 | 55 | 74 | 35 | 30 |
| Shore A hardness | 64 | 61 | 63 | 57 | 55 | 52 | 55 | 57 | 49 |
| Sp.Gr. Reclaim | 1.195 Whole tire | 1.195 Whole tire | 1.160 | 1.170 | 1.160 | 1.170 | 1.170 | 1.160 | Natural Rubber |
| Smoothness | Smooth | Smooth | butyl Rough | butyl Rough | butyl Rough | butyl Smooth | butyl Smooth | butyl Smooth | Smooth |

EXAMPLES 10F-32F

Tests have shown that the process of the present invention can be used to refine butyl reclaim. The results of tests using a 2" diameter screwless extruder of the kind shown in the drawings are set out in Table 10. Butyl feedstock was taken at random from the NMR strainer in the plant butyl system. The strained butyl was collected, cooled over night and run the following day. This was done on five different days. The processing conditions are set out below. Conditions 1, 2 and 5 represent processing in accordance with the present invention. Conditions 3 and 4 represent a control. The laboratory refiner used as the control was warmed-up with butyl stock before the samples were refined.

FIRST PROCESSING CONDITIONS

Processing Condition:
Condition 1    2 passes    Screwless Extruder
Axial gap, inches                       0.005
Rotor speed, rpm                        250
Rotor zone, temp. °C.    85 increasing to – 140
Header temp, °C.         85 increasing to – 145
Through-put rate of 2nd pass    shown in column 8
Condition 2    2 passes    Screwless Extruder
Axial gap, inches                       0.005
Rotor speed, rpm                        350
Rotor zone, temp. °C.    85 – 150
Header temp, °C.         85 – 160
Through-put rate of 2nd pass    shown in column 8
Condition 3    1 pass through the laboratory refiner
Condition 4    2nd pass through the laboratory refiner Condition 5    1 pass only    Screwless Extruder reduced feed rate
Axial gap, inches                       0.005
Rotor speed, rpm                        250
Rotor zone temp, °C.     85 – 120
Header temp, °C.         85 – 130
Through-put rate 1 pass    shown in column 8

TABLE 10
BUTYL REFINING STUDIES

| EXAMPLE | Process Condition | Mod. at 300% 30' at 320° F. | Tensile 30' at 320° F. | % Elonga. 30' at 320° F. | Shore A Hardness | Smoothness rating | Grains per in | Throughput gm/min | Mooney Ml 4 |
|---|---|---|---|---|---|---|---|---|---|
| 10F | 1 | 670 | 1030 | 510 | 55 | 3 | 12 | 24.7 | 40 |
| 11F | 2 | 650 | 980 | 530 | 55 | 3 | 12 | 25.0 | 34 |
| 12F | 3 | 680 | 1110 | 520 | 55 | 3 | 14 | — | 52 |
| 13F | 4 | 640 | 1100 | 540 | 50 | 2 | 7 | — | 48 |
| 14F | 1 | 310 | 370 | 400 | 56 | 3 | 17 | 23.4 | 40 |
| 15F | 2 | 280 | 320 | 370 | 60 | 3 | 22 | 24.3 | 43 |
| 16F | 3 | 320 | 420 | 410 | 55 | 3 | 20 | — | 47 |
| 17F | 4 | 300 | 430 | 470 | 53 | 3 | 18 | — | 42 |
| 18F | 1 | 390 | 450 | 380 | 53 | 3 | 15 | 20.2 | 45 |
| 19F | 2 | 360 | 400 | 380 | 54 | 3 | 13 | 22.4 | 35 |
| 20F | 3 | 430 | 580 | 440 | 50 | 2 | 7 | — | 65 |
| 21F | 4 | 380 | 520 | 420 | 50 | 3 | 11 | — | 56 |
| 22F | 5 | 400 | 520 | 410 | 51 | 2 | 10 | 6.5 | 49 |
| 23F | 1 | 710 | 1090 | 480 | 52 | 3 | 11 | 22.5 | 42 |
| 24F | 2 | 800 | 1130 | 460 | 55 | 2 | 10 | 24.1 | 35 |
| 25F | 3 | 770 | 1250 | 510 | 52 | 2 | 8 | — | 54 |
| 26F | 4 | 730 | 1200 | 520 | 52 | 1 | 5 | — | 49 |
| 27F | 5 | 800 | 1160 | 460 | 53 | 2 | 9 | 9.7 | 44 |
| 28F | 1 | 570 | 710 | 390 | 56 | 3 | 24 | 21.5 | 40 |
| 29F | 2 | 610 | 810 | 410 | 58 | 3 | 18 | 23.8 | 43 |
| 30F | 3 | 490 | 760 | 460 | 52 | 3 | 15 | — | 53 |
| 31F | 4 | 560 | 850 | 500 | 53 | 3 | 12 | — | 54 |
| 32F | 5 | 560 | 730 | 410 | 53 | 3 | 15 | 7.5 | 48 |

COMPARATIVE RECLAIMING DATA

Figure 3:
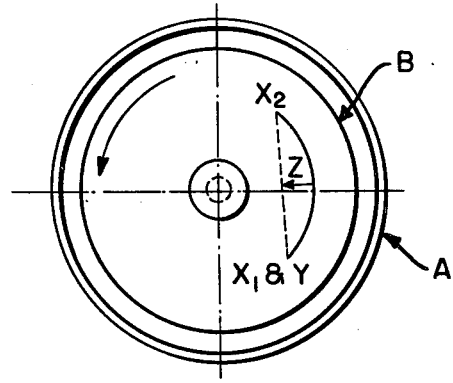
FIG. 3 is a schematic view illustrating operation of the apparatus

The following Table 11 shows examples of results obtained in reclaiming scrap vulcanized rubber — of the type indicated in the last line in each case — with the usual reclaiming agents commonly employed; showing side-by-side results obtained with a three-inch screw reclaimer of the type shown in U.S. Pat. No. 2,653,915 as modified in U.S. Pat. No. 3,051,990, in columns A, G, B and H, and with an extruder of said type (generally as shown in FIGS. 2 and 3 of the Maxwell U.S. Pat. No. 3,790,328) having a two-inch rotor, in columns C, E, D, and F. The reclaiming agent formula and the curing formula were those given in connection with Table 1.

TABLE 11

| Reclaiming Method | RECLAIMING 3" SCREW RECLAIMER | | | | 2" MIXER AND EXTRUDER OF THE PRESENT INVENTION | | | |
|---|---|---|---|---|---|---|---|---|
| Refining Method | Lab Refiner | | 2" Apparatus of the Present Invention | | Lab Refiner (Example 2) | | 2" Apparatus of the Present Invention | |
| Sample Number | A | G | B | H | C | E | D | F |
| Reclaimed product | | | | | | | | |
| Water cooled | X | X | X | X | | X | | X |
| Refined product | | | | | | | | |
| Water | | | | | | | | |
| 20' | | | X | | | | X | |
| Analysis: | | | | | | | | |
| Mooney viscosity | 42 | 51 | 75 | 58 | 45 | 45 | 74 | 47 |
| Shore hardness | 66 | 63 | 62 | 64 | 62 | 63 | 68 | 61 |
| Sp. Gr. | 1.180 | 1.190 | 1.190 | 1.195 | 1.190 | 1.190 | 1.190 | 1.185 |
| Cure at 293° F. | | | | | | | | |
| Modulus at 200% Elong. | | | | | | | | |
| 10" at 293° F. | 600 | 730 | 660 | 780 | 500 | 450 | 730 | 530 |
| 20' at 293° F. | 700 | 750 | 880 | 810 | 700 | 690 | 910 | 690 |
| Tensile | | | | | | | | |
| 10' at 293° F. | 990 | 1200 | 880 | 1120 | 830 | 830 | 860 | 620 |
| 24' at 293° f. | 1200 | 1230 | 970 | 1070 | 970 | 950 | 970 | 790 |
| % Elongation | | | | | | | | |
| 10' at 293° F. | 350 | 340 | 280 | 290 | 340 | 310 | 250 | 270 |
| 20' at 293° F. | 340 | 330 | 240 | 280 | 300 | 280 | 230 | 250 |

SUMMARY

It will thus be seen that the novel process of reclaiming rubber in accordance with the present invention can be carried out with apparatus originally designed for a completely different purpose, namely the mixing compounding and extruding of thermal plastic materials and that quite unexpectedly the process in accordance with the invention has been found to give excellent results, even producing reclaimed rubbers with unique properties and achieving power savings and economies as compared with prior rubber reclaiming processes. Moreover, in accordance with the present invention, it has been found possible to reclaim butyl which has heretofore been found to be extremely difficult to reclaim. The present invention thus represents an important advance in the rubber reclaiming art.

What I claim is:

1. A process of reclaiming vulcanized rubber which comprises feeding said rubber into a peripheral portion of an axial shear zone between essentially smooth, generally radial, axially spaced opposed surfaces defined by an end face of a rotor and the inner face of an end wall of a stator having a central discharge orifice in said end wall and rotating said rotor at a selected speed with selected spacing between said axially opposed surfaces of said rotor and stator to subject said rubber to an alternate arcuate extension and chordal contraction produced by adherence of said rubber to said axially opposed surfaces as said rotor rotates relative to said stator and thereby subject said rubber to mechanical and thermal working with evolved pressure and heat and propel said rubber centripetally to and out of said central discharge orifice while controlling the temperature of said rotor, stator and rubber and regulating the rate of feed of said rubber, the speed of rotation of the rotor and the axial spacing between said axially opposed surfaces to control the amount of mechanical working of the rubber to produce reclaimed rubber of quality and properties dependent of said temperature, rate of feed, rotational speed and axial spacing.

2. A process according to claim 1, wherein said vulcanized rubber is fed to an essentially smooth cylindrical peripheral surface of said rotor and is moved along said cylindrical surface to said peripheral portion of said axial shear zone at an end of said rotor.

3. A process according to claim 2, wherein said vulcanized rubber is guided by a stationary helical surface surrounding said cylindrical surface of the stator from the local at which said rubber is fed to said cylindrical surface to said peripheral portion of said axial shear zone.

4. A process according to claim 1, wherein said vulcanized rubber is fed to said axial shear zone in particulate form.

5. A process according to claim 4, wherein said vulcanized rubber fed to said axial shear zone is whole tire crumb.

6. A process according to claim 4, wherein said vulcanized rubber fed to said axial shear zone is undevulcanized butyl.

7. A process according to claim 6, wherein said butyl before being fed to said axial shear zone is cryogenically ground.

8. A process according to claim 4, wherein a selected proportion of reclaiming agents are fed with said vulcanized particulate rubber to said axial shear zone.

9. A process according to claim 4, wherein a selected proportion of reclaimed rubber is fed with said vulcanized particulate rubber to said axial shear zone.

10. A process according to claim 4, wherein said vulcanized particulate rubber fed to said axial shear zone has a particle size of −20 to −30 mesh.

11. A process according to claim 1, wherein said rotor is rotated at a speed providing a relative linear speed of said opposing surfaces defining said axial shear zone of the order of 1000 to 3500 in./m. in a peripheral portion of said axial shear zone.

12. A process according to claim 11, wherein the relative linear speed of said opposed surfaces in a peripheral portion of said axial shear zone is of the order of 1500 to 2500 in./m.

13. A process according to claim 1, wherein the spacing between said opposed surfaces defining said axial shear zone is of the order of 0.005 to 0.2 in.

14. A process according to claim 13, wherein the spacing between said opposed surfaces defining said axial shear zone is of the order of 0.02 and 0.1 in.

15. A process according to claim 1, wherein controlled heat is applied to at least one of said rotor and stator defining said axial shear zone while said rubber is centripetally propelled therethrough.

16. A process according to claim 1, wherein a controlled cooling medium is applied to at least one of said rotor and stator defining said axial shear zone while said rubber is centripetally propelled therethrough.

17. A process according to claim 4, wherein a selected proportion of powdered filler is fed with said vulcanized particulate rubber to said axial shear zone and is intimately mixed with said rubber as said rubber and filler are centripetally propelled to said discharge orifice.

18. A process of refining reclaimed rubber which comprises feeding said reclaimed rubber into a peripheral portion of an axial shear zone defined by essentially smooth, generally radial, axially spaced opposed surfaces defined by an end face of a rotor and the inner face of an end wall of a stator having a central discharge orifice in said end wall and rotating said rotor at a selected speed with selected spacing between said axially opposed surfaces to subject said rubber to alternate arcuate extension and chordal contraction produced by adherence of said rubber to said opposed surfaces as said rotor rotates relative to said stator and thereby subject said rubber to mechanical and thermal working with evolved heat and pressure and propel said rubber centripetally to and out of said central discharge orifice while controlling the temperature of said rotor, stator and rubber to and regulating the rate of feed of said rubber, the speed of rotation of the rotor and the axial spacing between said axially opposed surfaces to control the amount of mechanical working of the rubber to produce refined reclaimed rubber or quality and properties dependent of said temperature, rate of feed, rotational speed and axial spacing.

* * * * *